United States Patent [19]
Kamigaito et al.

[11] 4,066,468
[45] Jan. 3, 1978

[54] CERAMICS OF SILICON NITRIDE

[75] Inventors: Osami Kamigaito; Yoichi Oyama, both of Nagoya, Japan

[73] Assignee: Kabushiki Kaisha Toyota Chuo Kenkyusho, Japan

[21] Appl. No.: 785,893

[22] Filed: Apr. 8, 1977

Related U.S. Application Data

[60] Continuation-in-part of Ser. No. 602,046, Aug. 5, 1975, abandoned, which is a division of Ser. No. 316,940, Dec. 20, 1972, Pat. No. 3,903,230.

[30] Foreign Application Priority Data

Dec. 21, 1971  Japan ............................... 46-104454

[51] Int. Cl.$^2$ ........................ C04B 33/32; C04B 35/58
[52] U.S. Cl. ..................................... 106/73.4; 106/65; 106/73.5; 264/65
[58] Field of Search ................. 106/73.4, 65, 73.5; 264/65

[56] References Cited

U.S. PATENT DOCUMENTS

3,837,871  9/1974  Weaver .................................. 106/65

FOREIGN PATENT DOCUMENTS

285,005  10/1965  Australia ............................. 264/65
970,639   9/1964  United Kingdom.

OTHER PUBLICATIONS

Jack, K. H. et al., "Ceramics Based on the Si–Al–O–N and Related Systems" Nature–Physical Science 238, pp. 28–29, July 10, 1972.
Oyama, Y. "Solid Solution in the Ternary System, $Si_3N_4$–AlN–$Al_2O_3$" Japan, J. Appl. Phys. 11, No. 5 (1972) pp. 760–761.
Masaki, H. et al., "Low Temperature Synthesis of Silicon Nitride Solid Solution" Japan, J. Appl. Phys. 14, No. 2 (Feb. 1975) pp. 301–302.

*Primary Examiner*—Helen M. McCarthy
*Attorney, Agent, or Firm*—Blum, Moscovitz, Friedman & Kaplan

[57] ABSTRACT

Ceramic products composed essentially of a novel silicon nitride solid solution, which have high heat resistance, high abrasion resistance and low thermal expansion are obtained by sintering mixed powders of silicon nitride, alumina and aluminum nitride. The sintering includes heating said mixed powders at a temperature between 1650° C and 2000° C under a high pressure or no pressure. During the heating most of the alumina and aluminum nitride are occluded in silicon nitride and said ceramics products composed of silicon nitride solid solution are formed.

9 Claims, 1 Drawing Figure

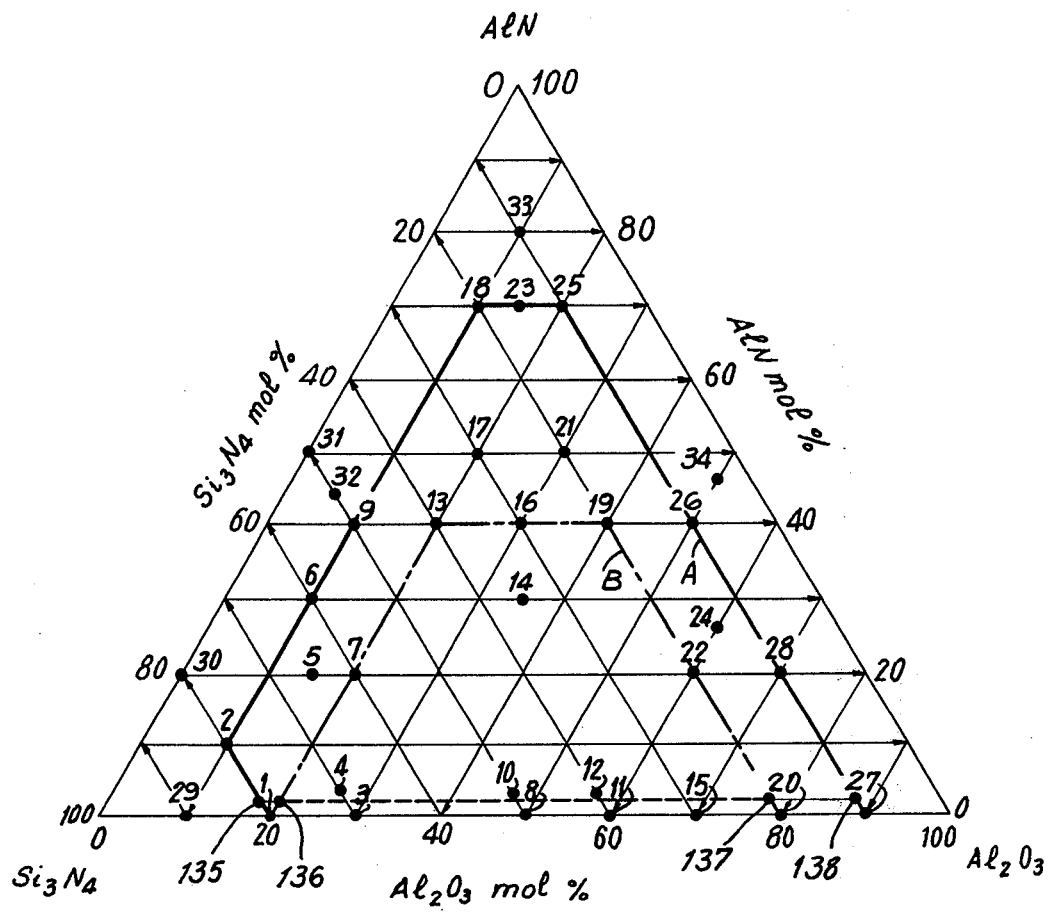

CERAMICS OF SILICON NITRIDE

RELATED U.S. APPLICATION DATA

This is a continuation-in-part of U.S. patent application Ser. No. 602,046, filed Aug. 5, 1975, now abandoned, which is a divisional application of U.S. Patent application Ser. No. 316,940 filed Dec. 20, 1972, now U.S. Pat. No. 3,903,230, issued Sept. 2, 1975.

BACKGROUND OF THE INVENTION

Hitherto lithia ($Li_2O$) -alumina-silicate base ceramics, for example $\beta$-spodumen and eucriptite, have been known as ceramics having a low thermal expansion coefficient. Such ceramics are however, unsatisfactory due to their low heat resistance. For example, these ceramics, which have a low thermal expansion coefficient ($1.0 \times 10^{-6}/°C \sim 3.0 \times 10^{-6}/°C$) melt at a relatively low temperature (at 1,400° C or below 1,400° C); therefore the maximum temperature at which they may be used is relatively low. Moreover, ceramics of silicon nitride in which magnesia (MgO) is occluded, have been known as possessing high abrasion resistance. This type of ceramic has therefore been employed for high temperature bearings and the like. However, the abrasion resistance of these ceramics is inadequate for high temperature bearings. During use, abrasion of the ceramics is accelerated due to the powder formed by abrasion from the ceramics themselves.

SUMMARY OF THE INVENTION

The ceramic products of the instant invention are formed by sintering powdered mixtures of from 10 to 80 mol percent of silicon nitride, from 10 to 88 mol percent of alumina and from 2 to 70 mol percent aluminum nitride. The compositions are mainly composed of a novel phase of a solid solution based on silicon nitride or of the mixture of said novel phase and a novel compound having the lattice constants (d) 2.89, 2.79, 2.61, 2.58, 2.31, 2.15, 2.04, 1.82, 1.496 and 1.39 A, with a permissible error range of about 5%. The ceramics are high in abrasion resistance and corrosion resistance and can be used at or in excess of 1400° C and are produced by heating a mixed powder of silicon nitride, alumina and alumina nitride at a temperature between 1650° C and 2000° C.

Accordingly, a principal object of the present invention is to provide improved ceramics having high abrasion resistance, high heat resistance and a low thermal expansion coefficient.

Another object of the present invention is to provide an improved ceramic of silicon nitride, alumina and aluminum nitride having high abrasion resistance, high heat resistance and a low thermal expansion coefficient.

A further object of the present invention is to provide a method for producing improved ceramics of silicon nitride, alumina and aluminum oxide having the aforementioned properties.

Still other objects and advantages of the invention will in part be obvious and will in part be apparent from the specification.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

BRIEF DESCRIPTION OF THE DRAWING

For a fuller understanding of the invention, reference is had to the following description taken in connection with the accompanying drawing, in which:

The single FIGURE is a triangular coordinate diagram showing the composition ranges of the mixed powders which are used to form the ceramics of the present invention.

DESCRIPTION OF THE PREFERRED EMBODIMENTS

The products of the present invention have a low thermal expansion coefficient nearly equal to that of lithia-alumina-silicate base ceramics. Also, products have remarkably good heat resistance and oxidation resistance and can be used at about 1400° C or at a temperature above 1400° C in some cases. With respect to abrasion resistance, compared with the ceramics composed of solid solution of magnesia in silicon nitride, the silicon nitride base ceramics of the present invention are superior.

In the present invention, it is important to define the composition ranges of the mixed powders of silicon nitride, alumina and aluminum nitride. Silicon nitride solid solution ceramics having the remarkable characteristics mentioned above can be produced by sintering or hot pressing in non-oxidizing atmosphere at a temperature between 1650° C and 2000° C mixed powders composed of 10 to 80 mol percent of silicon nitride, 10 to 88 mol percent alumina and 2 to 70 mol percent of aluminum nitride. The composition ranges of each component (outer composition region) are shown in the area enclosed by the lines joining points 135, 2, 18, 25 and 138 on the triangular coordinate diagram in the accompanying figure.

The composition diagram is prepared in the form of a regular triangle. All the sides of the diagram have corresponding scales. The left-hand and right-hand sides represent the silicon nitride content and the aluminum nitride content, respectively, while the bottom side represents the alumina content. A line parallel to the bottom line represents a constant aluminum nitride content. Any line parallel to the left side line or the right side line, respectively represents a constant alumina content and a constant silicon nitride content. Each composition indicated by points 1–34 in the FIGURE is listed in the accompanying table. The percentages (%) used in this specification represent mol percentages except where otherwise indicated.

The sintering time should be between about 10 and 40 minutes. This period is necessary to form a solid solution of alumina and aluminum nitride in silicon nitride. The pressure range is preferably 100 kg/cm² to 300 kg/cm².

It was recognized that the ceramics of the present invention, are mainly composed of a novel phase of a solid solution based on silicon nitride or of the mixture of said novel phase and a novel compound having the following lattic constants (d), 2.89, 2.79, 2.61, 2.58, 2.31, 2.15, 2.04, 1.82, 1.496 and 1.39 A. Said lattice constants include permissible error range, about 5%, caused by the measuring technique. It is not clear why the ceramics of the novel phase have such a high abrasion resistance, but it is thought that relatively many empty lattice points are formed in said novel phase because alumina is occluded in silicon nitride, and microstress fields are formed because of the existence of these lattice defects; these microstress fields are considered to be responsible for the excellent hardness and the abrasion resistance of the resultant ceramic. The lattice structure of the novel compound has not been established; however, the compound can be defined as that having the given lattice constants. The ceramics obtained by the present invention are composed of more than 80% by weight of said novel phase of the solid solution or of the mixture of said novel phase of the solid solution and the novel compound. The thermal expansion coefficient of the ceramics is about $3.0 \times 10^{-6}/°$ C or less. Also, it is recognized that the ceramics have about 1.5 to 5 times superior abrasion resistance and nearly equal or somewhat superior oxidation resistance compared to those of conventional silicon nitride-magnesia base ceramics.

Further, the preferred ceramics of the invention are formed by hot pressing mixed powders composed of about 20 to 78 mol percent of silicon nitride, about 20 to 78 mol percent of alumina and about 2 to 40 mol percent of aluminum nitride. The composition ranges of each component used to obtain the preferred ceramics (inner composition region) are shown in the area enclosed by the broken lines joining points 136, 13, 19 and 137 in the FIGURE. These ceramics have a remarkably low thermal expansion coefficient (about $2.5 \times 10^{-6}°$ C or lower) in addition to high abrasion resistance. The ceramics in this inner composition region represent a preferred embodiment of the invention. These ceramics contain large amounts of the novel phase of the solid solution based on silicon nitride compared with that of the ceramics formed from the mixed powders within the outer composition region.

Hitherto, it was thought that the thermal expansion coefficient of silicon nitride alumina base ceramics becomes higher if the content of alumina in the ceramics increases over 20 mol percent. This position is correct as far as said alumina exists as α-alumina in the ceramics. However, it is not true when said alumina is occluded in silicon nitride. The ceramics composed of a solid solution of alumina in silicon nitride within said inner composition region show a remarkably low thermal expansion coefficient even though the alumina content is as much as 78 mol percent. Also, the oxidation and heat resistances of said ceramics are very good.

Aluminum nitride in the mixed powders of the present invention works to improve abrasion resistance of the silicon nitride base ceramics and to promote the formation of the solid nitride base ceramics and to promote the formation of the solid solution of alumina in silicon nitride. Practically, if aluminum nitride is not included in the silicon nitride, it is necessary to heat material powder at a high temperature for a long time in order to occlude alumina in silicon nitride. Under these conditions both alumina and silicon nitride are apt to be lost by evaporation during the step of forming a solid solution of alumina in silicon nitride so that ceramics of the desired composition are not easily obtained.

When about 2 mol percent of aluminum nitride is added to the mixed powders of silicon nitride and alumina, the solid solution of alumina in silicon nitride is formed easily and little evaporation of alumina and silicon nitride occurs under the conditions mentioned above.

For example, the mixed powders of 55 mol percent of silicon nitride and 45 mol percent of alumina (aluminum nitride was not included) were sintered at 1700° C for 30 minutes in a nitrogen atmosphere at a pressure of 250 kg/cm² to obtain 5 samples. Two out of the 5 samples lost more than 20 weight percent. The chemical analysis of these samples showed weight decrease mainly caused by the disappearance of alumina.

In contrast, the mixed powders of 53 mol percent of silicon nitride, 45 mol percent of alumina and 2 mol percent of aluminum nitride, and that of 45 mol percent of silicon nitride, 45 mol percent of alumina and 10 mol percent of aluminum nitride were sintered at 1750° C for 30 minutes under a pressure of 250 kg/cm² to obtain 5 samples of each composition. There was no weight decrease of over 5%.

It is thought that the ionic bonding of alumina is weakened somewhat, and that the formation of a solid solution of alumina in silicon nitride is promoted because of the presence of aluminum nitride which includes the same element as does alumina and has relatively strong covalent characteristics. Because the weight decrease is prevented by the addition of aluminum nitride into the mixed powders, the weight of the ceramics produced can be controlled precisely, so that the formation of defective products generally can be prevented. Furthermore, it is recognized that when alumina is in the form of a solid solution, the heat and abrasion resistant ceramic is rendered homogeneous and the quality of the ceramic is consequently uniformly satisfactory.

In the case of the ceramics of the present invention, it is preferable to maintain the temperature of heat treatment from 1650° C to 2000° C. When the heating temperature is at about 1600° C, the sintering operation cannot be completely carried out with certain compositions, and when the heating temperature is over 2000° C, silicon nitride is evaporated to a large extent, so that the ceramic produced is of relatively poor quality. The density of the sintered material is increased if the sintering is carried out under pressure. Also, the sintering operation must be carried out in non-oxidizing atmosphere.

Following is the procedure used in preparing test specimens:

PROCEDURE

Mixed powders consisting of silicon nitride fine powder (passable through 200 mesh), alumina fine powder and aluminum nitride fine powder (both passable through 400 mesh) were pressed at high temperature in a nitrogen atmosphere with a punch in a graphite die having an inner diameter of 40 mm. The heating temperature was 1500° C to 1800° C, the heating period was 10 minutes to 40 minutes and the pressure was 100 kg/cm² to 300 kg/cm².

Each sample was cooled after the sintering operation, and then porosity, oxidation resistance, abrasion resistance and coefficient of thermal expansion thereof were measured. The elements included in each sample were analyzed by means of an electron probe micro-analyzer and the compounds present were analyzed by means of X-ray diffraction and the quantity present was determined by the intensity of diffracted X-rays.

The abrasion resistance was determined by the following method: Each sample of 40 mm diameter was ground against a cast iron lapping surface for 12 hours under the condition of 43 m/min abrasive speed and 25 g/cm² surface pressure, with 300 mesh silicon carbide after which the weight decrease of the sample was measured.

The oxidation resistance was measured as follows: Each sample of 40 mm diameter was ground with 800 mesh silicon carbide to form a smooth surface, and then was oxidized for 48 hours at 1200° C in an electric furnace in air after which the weight gain was measured. The coefficient of thermal expansion was measured in air by means of a dilatometer.

The treatment condition and the measured result of the obtained material will be shown in the table below. For comparison, the measured result of the sample obtained by sintering silicon nitride with 5 mol percent of magnesia is also shown. In the table, α denotes coefficient of thermal expansion. $P_o$ denotes porosity.

As shown in the table and in the single FIGURE in which the values of the table are plotted (the reference numerals in the drawing correspond to the numbers of the samples in the table), when compositions of mixed powders consisting of 10-80 mol percent of silicon nitride, 10-88 mol percent of alumina and 2-70 mol percent of aluminum nitride are sintered, many kinds of sintered products are obtained in which the solid solution of silicon nitride of the solid solution and the novel compound are included as the main components constituting more than 80 mol percent of the sintered material. The abrasion resistance is very good; namely, the abraded quantity of each sintered material is about 1 gm of less and also the coefficient of thermal expansion thereof is very low; namely, it is about $3 \times 10^{-6}/°$ C or less.

Table

| Sample | Mixed Powder | | | Treatment Condition | | | Measured result | | | | Compound |
|---|---|---|---|---|---|---|---|---|---|---|---|
| | $Si_3N_4$ (m/o) | $Al_2O_3$ (m/o) | AlN (m/o) | Pressure (kg/cm$^2$) | Temperature (° C) | Time (min) | $P_o$ (%) | Oxidation increment (mg/cm$^2$) | Abraded quantity (gm) | α ($\times 10^{-6}$/° C) | |
| 1 | 80 | 20 | 0 | 300 | 1850 | 30 | 10 | 0.7 | 0.69 | 2.4 | $Si_3N_4$ ss |
| 2 | 80 | 10 | 10 | 300 | 1850 | 30 | 8 | 1.0 | 0.88 | — | $Si_3N_4$ ss |
| 3a | 70 | 30 | 0 | 200 | 1700 | 30 | 2 | 0.5 | 0.89 | 2.2 | $Si_3N_4$ ss, $Si_3N_4$ small quantity |
| 3b | 70 | 30 | 0 | 0 | 1750 | 40 | 5 | 0.5 | 0.30 | — | $Si_3N_4$ ss |
| 4 | 70 | 27 | 3 | 300 | 1600 | 40 | 10 | 0.45 | — | 2.2 | $Si_3N_4$ ss, $Si_3N_4$ small quantity |
| 5 | 65 | 15 | 20 | 300 | 1750 | 25 | 1 | 0.8 | 0.93 | — | $Si_3N_4$ ss |
| 6 | 60 | 10 | 30 | 150 | 1850 | 15 | 1 | 0.9 | 0.80 | 2.9 | $Si_3N_4$ ss, AlN(0~20 w/o) |
| 7 | 60 | 20 | 20 | 250 | 1750 | 30 | 1 | 0.7 | 0.80 | 2.5 | $Si_3N_4$ ss, AlN(~15 w/o) |
| 8 | 50 | 50 | 0 | 300 | 1750 | 30 | 1 | 0.7 | 0.65 | 2.0 | $Si_3N_4$ ss, $Si_3N_4$ small quantity |
| 9 | 50 | 10 | 40 | 200 | 1850 | 15 | 1 | 0.9 | 1.01 | — | $Si_3N_4$ ss, AlN(~3 w/o) |
| 10 | 50 | 47 | 3 | 300 | 1750 | 15 | 1 | 0.65 | 0.58 | 2.2 | $Si_3N_4$ ss |
| 11 | 40 | 60 | 0 | 200 | 1750 | 30 | 1 | 0.8 | — | 2.1 | $Si_3N_4$ ss, $Si_3N_4$ small quantity |
| 12 | 40 | 57 | 3 | 200 | 1600 | 30 | 8 | 1.0 | — | 2.0 | $Si_3N_4$ ss, $Si_3N_4$ small quantity |
| 13 | 40 | 20 | 40 | 200 | 1800 | 25 | 1 | 0.5 | — | 2.5 | $Si_3N_4$ AlN small quantity |
| 14 | 35 | 35 | 30 | 300 | 1750 | 20 | 1 | 0.6 | — | 2.5 | $Si_3N_4$ ss |
| 15 | 30 | 70 | 0 | 200 | 1750 | 30 | 1 | 0.9 | 0.70 | 2.4 | $Si_3N_4$ ss |
| 16 | 30 | 30 | 40 | 250 | 1800 | 25 | 1 | 0.9 | 0.6 | 2.5 | $Si_3N_4$ ss |
| 17 | 30 | 20 | 50 | 100 | 1600 | 20 | 1 | 0.5 | — | 3.0 | $Si_3N_4$ ss, $Al_2O_3$ (~5 w/o), AlN (~17 w/o) |
| 18 | 20 | 10 | 70 | 300 | 1800 | 25 | 1 | 0.7 | 1.02 | — | $Si_3N_4$ ss (~20 w/o) AlN (~10 w/o) Novel Compound |
| 19 | 20 | 40 | 40 | 250 | 1750 | 30 | 1 | 0.9 | 1.20 | 2.5 | $Si_3N_4$ ss |
| 20 | 20 | 80 | 0 | 300 | 1800 | 25 | 1 | 0.9 | — | 2.4 | $Si_3N_4$ ss |
| 21 | 20 | 30 | 50 | 250 | 1750 | 30 | 1 | 0.8 | — | 2.8 | $Si_3N_4$ ss, AlN(10 w/o) Spinel (~13 w/o) |
| 22 | 20 | 60 | 20 | 200 | 1700 | 25 | 1 | 0.85 | — | 2.3 | $Si_3N_4$ ss (~3 w/o) Novel Compound |
| 23 | 15 | 15 | 70 | 300 | 1800 | 25 | 1 | 0.7 | 1.00 | — | $Si_3N_4$ ss (25 w/o) AlN (~10 w/o) Novel Compound |
| 24 | 15 | 60 | 25 | 300 | 1750 | 20 | 1 | 0.8 | 1.25 | — | $Si_3N_4$ ss (8 w/o) Spinel (~3 w/o) Novel Compound |
| 25 | 10 | 20 | 70 | 200 | 1850 | 20 | 1 | 0.8 | 0.98 | — | $Si_3N_4$ ss (22 w/o) AlN(~10 w/o) Novel Compound |
| 26 | 10 | 50 | 40 | 250 | 1800 | 30 | 1 | 0.9 | 1.20 | — | $Si_3N_4$ ss (~7 w/o) Spinel (~5 w/o) Novel Compound |
| 27a | 10 | 90 | 0 | 100 | 1750 | 25 | 1 | 1.0 | 1.40 | — | $Si_3N_4$ ss, α-$Al_2O_3$(5 w/o) |
| 27b | 10 | 90 | 0 | 300 | 1800 | 25 | 1 | 1.0 | — | 3.1 | $Si_3N_4$ ss, α-$Al_2O_3$(25 w/o) |
| 28 | 10 | 70 | 20 | 200 | 1700 | 30 | 1 | 1.0 | — | 2.5 | $Si_3N_4$ ss α-$Al_2O_3$(15 w/o) |
| 29 | 90 | 10 | 0 | 300 | 1750 | 30 | 15 | 1.5 | 1.5 | — | $Si_3N_4$ ss, $Si_3N_4$ small quantity |
| 30 | 80 | 0 | 20 | 300 | 1850 | 25 | 5 | 1.5 | 2.50 | — | $Si_3N_4$, AlN(8w/o) |
| 31 | 50 | 0 | 50 | 300 | 1850 | 25 | 15 | 1.4 | 2.53 | — | $Si_3N_4$, AlN(22 w/o) |
| 32 | 50 | 5 | 45 | 250 | 1750 | 25 | 3 | 1.2 | 1.55 | — | $Si_3N_4$ ss (25 w/o), AlN(~8 w/o) Novel Compound |
| 33 | 10 | 10 | 80 | 250 | 1900 | 20 | 1 | 0.8 | 1.50 | — | $Si_3N_4$ ss (15 w/o) AlN (~20 w/o) Novel Compound |
| 34 | 5 | 50 | 45 | 250 | 1750 | 25 | 1 | 0.96 | 1.53 | — | $Si_3N_4$ ss (5 w/o) Spinel (~18 w/o)AlN(3 w/o) Novel Compound |

Table-continued

| | Mixed Powder | | | Treatment Condition | | | | Measured result | | | |
|---|---|---|---|---|---|---|---|---|---|---|---|
| Sample | $Si_3N_4$ (m/o) | $Al_2O_3$ (m/o) | AlN (m/o) | Pressure (kg/cm²) | Temperature (°C) | Time (min) | $P_o$ (%) | Oxidation increment (mg/cm²) | Abraded quantity (gm) | $\alpha$ ($\times 10^{-6}$/°C) | Compound |
| 35 | 70 | 30 | 0 | 300 | 1500 | 40 | 20 | 1.1 | 2.00 | — | $Si_3N_4$ ss, $Si_3N_4$ (20 w/o), $\alpha$-$Al_2O_3$ (5 w/o) |
| 36 | 40 | 60 | 0 | 200 | 1600 | 30 | 15 | 1.5 | — | 3.2 | $Si_3N_4$ ss, $Si_3N_4$ small quantity, $\alpha$-$Al_2O_3$ (40 w/o) |
| 37 | 70 | 30 | 0 | 300 | 1600 | 40 | 20 | 1.5 | — | 2.9 | $Si_3N_4$ ss, $Si_3N_4$ small quantity, $\alpha$-$Al_2O_3$ (25 w/o) |
| 38 | $Si_3N_4$ 95%/MgO 5% | | | 300 | 1750 | 30 | 1 | 2.0 | 1.58 | 3.5 | $Si_3N_4$ |

Powder quantities in mol %
ss - solid solution

Also, when compositions consisting of 20–78 mol percent of silicon nitride, 20–78 mol perent of alumina and 2–40 mol percent of aluminum nitride are sintered, each resultant sintered material consists mainly of a solid solution of silicon nitride, and its coefficient of thermal expansion is about $2.5 \times 10^{-6}$/° C or less, such a low value being valuable for many purposes, especially in resistance to fracture under sudden temperature shock.

Furthermore, in case the silicon nitride content is more than 80 mol percent or less than 10 mol percent (samples 29, 34), in case the alumina is less than 10 mol percent (samples 30, 31, 32) and in case the aluminum nitride is more than 70 mol percent (sample 33), the abrasion resistance of the sintered product is somewhat inferior (the abraded quantity is about 1.5 gm or more) to those in which the mixed powders lie within the preferred composition range of the present invention. The abrasion resistance of the material such as samples 29–34 is nearly equal to the abrasion resistance of the material obtained by occluding magnesia in silicon nitride. It is also recognized that the inferior abrasion resistance of samples 35 and 37 is caused by too low a sintering temperature.

As described above, the sintered ceramic material obtained according to the present invention has high temperature resistance, high oxidation resistance, high abrasion resistance and low thermal expansion characteristics, so that the material can be widely employed for bearings, ceramics cutting, blast nozzles and the like.

It will thus be seen that the objects set forth above, among those made apparent from the preceding description, are efficiently attained and, since certain changes may be made in carrying out the above method and in the composition set forth without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A high heat resistant and high abrasion resistant ceramic comprising a silicon nitride solid solution, wherein said silicon nitride solid solution is formed by sintering a powdered mixture consisting of from 10 mol percent to 80 mol percent of silicon nitride, from 10 mol percent to 88 mol percent of alumina and from 2 mol percent to 70 mol percent of aluminum nitride at a temperature from about 1650° C to about 2000° C in a non-oxidizing atmosphere for a time between about 10 to 40 minutes.

2. The ceramic of claim 1 wherein said sintering is carried out under a pressure between about 100 kg/cm² and 300 kg/cm².

3. The ceramic of claim 1 wherein said mixture consists of from 20 mol percent to 78 mol percent of silicon nitride, from 20 mol percent to 78 mol percent of alumina and from 2 mol percent to 40 mol percent of aluminum nitride.

4. The ceramic of claim 2 wherein said mixture consists of from 20 mol percent to 78 mol percent of silicon nitride, from 20 mol percent to 78 mol percent of alumina and from 2 mol percent to 40 mol percent of aluminum nitride.

5. A high heat resistant and high abrasion resistant ceramic comprising a silicon nitride solid solution, wherein said silicon nitride solid solution is formed by sintering a powdered mixture consisting of silicon nitride, alumina and aluminum nitride, the amounts thereof being defined by and included in a polygonal area on a triangular coordinate diagram of silicon nitride, alumina and aluminum nitride, the polygon having five apexes of which the first one being defined by a first ratio of 80 mol percent of silicon nitride, 10 mol percent of alumina and 10 mol percent of aluminum nitride, the second one being defined by a second ratio of 20 mol percent of silicon nitride, 10 mol percent of alumina and 70 mol percent of aluminum nitride, the third one being defined by a third ratio of 10 mol percent of silicon nitride, 20 mol percent of alumina and 70 mol percent of aluminum nitride, the fourth one being defined by a fourth ratio of 10 mol percent of silicon nitride, 88 mol percent of alumina and 2 mol percent of aluminum nitride, and a fifth one being defined by a fifth ratio of 80 mol percent of silicon nitride, 18 mol percent of alumina and 2 mol percent of aluminum nitride and sintering said mixture at a temperature between 1650° C and 2000° C in a non-oxidizing atmosphere for a time between 10 and 40 minutes.

6. The ceramic as defined in claim 5 wherein the composition of said mixture falls within the polygon having four apexes of which the first one is defined by a first ratio of 78 mol percent of silicon nitride, 20 mol percent of alumina and 2 mol percent of aluminum nitride, the second one being defined by a second ratio of 40 mol percent of silicon nitride, 20 mol percent of alumina and 40 mol percent of aluminum nitride, the third one being defined by a third ratio of 20 mol percent of silicon nitride, 40 mol percent of alumina and 40 mol percent aluminum nitride, and the fourth one being defined by a fourth ratio of 20 mol percent of silicon nitride, 78 mol percent of alumina and 2 mol percent of aluminum nitride.

7. A method of producing a high heat-resistant and high abrasion-resistant ceramic comprising a silicon nitride solid solution comprising the steps of forming a powdered mixture of from 10 mol percent to 80 mol percent of silicon nitride, from 10 mol percent to 88 mol percent of alumina and from 2 mol percent to 70 mol percent of aluminum nitride and sintering said mixture at a temperature from 1650° C to 2000° C in a non-oxidizing atmosphere for from 10 to 40 minutes.

8. The method of claim 7 wherein said sintering is carried out under a pressure from between about 100 kg/cm$^2$ and 300 kg/cm$^2$.

9. The method of claim 7 wherein said mixture comprises from 20 mol percent to 78 mol percent of silicon nitride, from 20 mol percent to 78 mol percent of alumina and from 2 mol percent to 40 mol percent of aluminum nitride.

* * * * *